June 2, 1925.
E. J. DOBERSTEIN
1,540,111
BRAKE
Filed Nov. 2, 1922
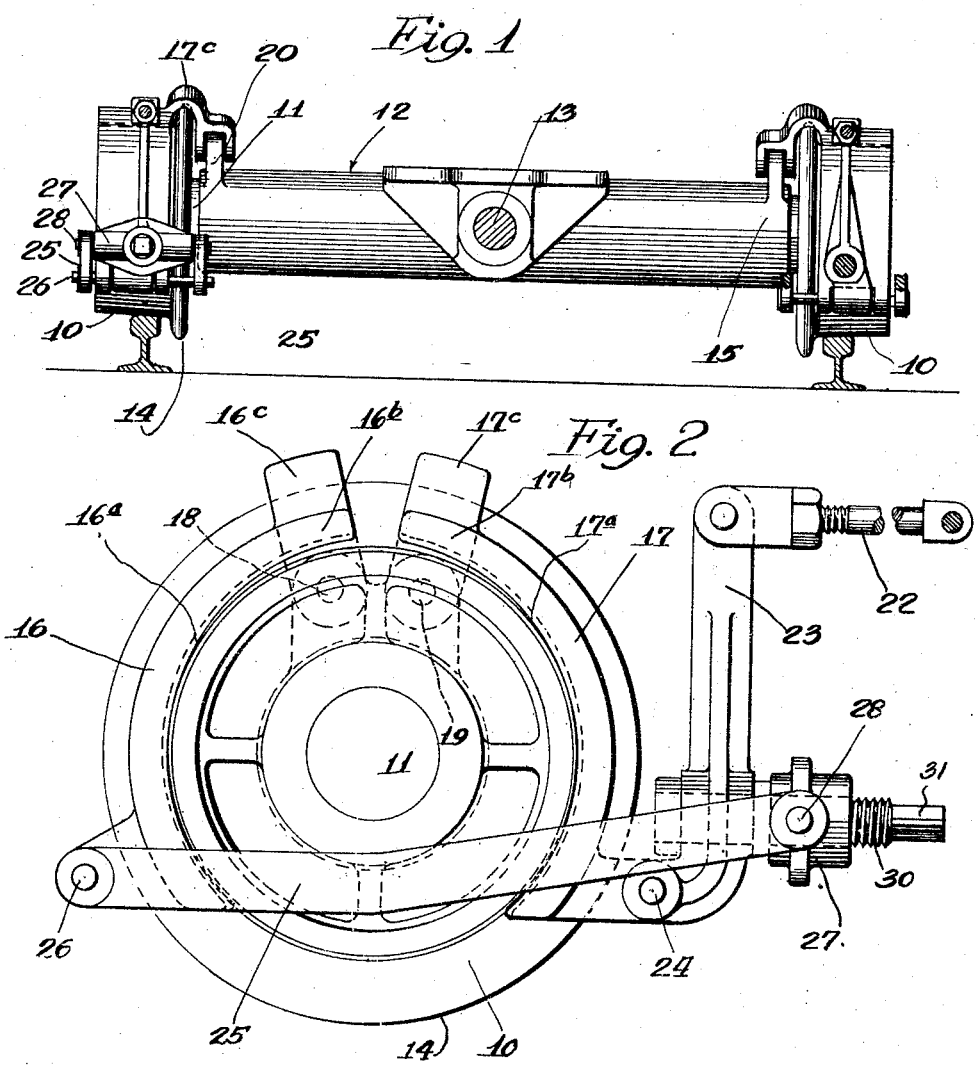
Inventor:
Edward J. Doberstein
By: Clarence F. Poole
Attorney.

Patented June 2, 1925.

1,540,111

UNITED STATES PATENT OFFICE.

EDWARD J. DOBERSTEIN, OF BLUE ISLAND, ILLINOIS, ASSIGNOR TO GOODMAN MANUFACTURING COMPANY, OF CHICAGO, ILLINOIS, A CORPORATION OF ILLINOIS.

BRAKE.

Application filed November 2, 1922. Serial No. 598,680.

*To all whom it may concern:*

Be it known that I, EDWARD J. DOBERSTEIN, a citizen of the United States, residing at Blue Island, in the county of Cook and State of Illinois, have invented an Improvement in Brakes, of which the following is a specification.

This invention relates to improvements in wheel brakes for cars and the like, and has for its principal object to provide an improved brake mechanism which is simple in construction and positive in operation. Other objects will appear as the description proceeds.

The invention can be best understood by reference to the accompanying drawings, in which Figure 1 shows one embodiment thereof as applied to an axle having a pivoted mounting on the main frame of a car or the like. Figure 2 is an enlarged side view of the brake shown in Figure 1.

In the drawings, the brake mechanism is shown is applied to a pair of wheels, 10, 10, mounted on an axle 11. The axle is shown as journaled in a bracket 12, which has pivotal connection as indicated at 13, with the car frame. The main frame of the car is not shown, at it forms no part of the present invention. It will be understood, however, that my invention may also be used in any ordinary construction of cars or locomotives as for instance, where spring suspension means is interposed between the axle and the main frame.

The brake devices on each wheel in Figure 1 are similar, so that like numerals apply to each device. A pair of arcuate brake members 16 and 17, are each pivotally connected at adjacent ends to a collar, or similar member, which is movable with the axle 11, but fixed against rotation thereon. In the construction shown, the respective brake members 16 and 17 have friction surfaces or shoes 16$^a$ and 17$^a$ arranged to engage the tread of the wheel 10, and the adjacent ends 16$^b$ and 17$^b$ thereof are provided with integral arms 16$^c$ and 17$^c$, respectively, which extend over the flange 14 of wheel 10 and are pivoted at 18 and 19 respectively to a projecting member 20 mounted on the end of the bracket 12. The brake members are thus supported to move with the axle, and are restrained against rotation with respect thereto, but it will be understood that a similar result may be afforded by providing a separate member, such as a collar adjacent each wheel, which collar is movable with the axle but fixed against rotation.

The brake members are controlled by a brake rod 22, which may have connection with a controlling device (not shown) of any ordinary design, mounted on the main frame of the car in the usual manner. Said brake rod is connected to an upwardly extending arm 23 which is pivotally connected at 24 to the lower end of the brake member 17. A pair of connecting links 25, 25 are arranged on the opposite sides of the wheel 10 and are pivotally connected at one end to the lower, or free end of the brake member 16, as indicated at 26. The opposite ends of these links are pivotally connected to a cross beam 27 as indicated at 28. This cross beam is connected to the lever arm 23 at a point intermediate the brake rod 22 and the point 24 of pivotal connection of said arm with the brake member 17, as shown. By means of this arrangement, it will be observed that a pull on the brake rod 22 in a direction away from the wheel tends to clamp the brake members 16 and 17 together, and thereby applies braking friction to the wheel. The brake may be adjusted by means of a screw 30 threaded in the cross-member 27 and having a spindle 31 rotatably mounted in the arm 23, as shown. By turning the screw 30 it will be seen that the brake members 16 and 17 will be tightened or loosened with respect to the wheel, as desired.

From the above description it will be seen that the brake will be effective in all positions of the axle with respect to the main frame. The lever arm 23 is supported by the brake members 16 and 17, and is movable therewith, independent of the car frame. The brake rod 22 extends horizontally, substantially and at right angles to the lever 23 so that relative vertical movement of the axle and the frame is permitted without materially affecting the tension on the brake.

Although I have shown and described one form in which my invention may be embodied, it will be understood that many other means may be employed for accomplishing the same results, without departing from the spirit and scope of my invention. I do not therefore wish to be understood as limiting myself to the specific construction illustrated herein excepting as specifically limited in the appended claims.

I claim as my invention:

1. In a brake, the combination of a frame, a rotatable brake drum, a collar mounted concentric with and adjacent said brake drum, means associated with said frame restraining said collar from rotation respective to said brake drum, a pair of brake members each having a pivotal connection with said collar at their adjacent ends, and adapted to have frictional engagement with opposite sides of said brake drum, and controlling means for said brake members, including a lever arm pivotally connected to the free end of one of said brake members, a link pivotally connecting the free end of the other of said brake members with said lever arm, and means on said frame for actuating said lever arm, including a brake rod pivoted thereto, said lever arm being supported by the pivotal connections aforesaid independent of the frame.

2. In a brake, the combination of a frame, a rotatable brake drum, a collar mounted concentric with and adjacent said brake drum, means associated with said frame restraining said collar from rotation respective to said brake drum, a pair of brake members each having a pivotal connection with said collar at their adjacent ends, and adapted to have frictional engagement with opposite sides of said brake drum, and controlling means for said brake members, including a lever arm pivotally connected to the free end of one of said brake members, a link pivotally connecting the free end of the other of said brake members with said lever arm, at a point beyond but normally out of alignment with the pivotal connection of said lever arm and said first named brake member, and means on said frame for actuating said lever arm, including a brake rod pivoted thereto, said lever arm being supported by the pivotal connections aforesaid independent of the frame.

3. In a brake, the combination of a frame, a rotatable brake drum, a collar mounted concentric with and adjacent said brake drum, means associated with said frame restraining said collar from rotation respective to said brake drum, a pair of brake members each having a pivotal connection with said collar at their adjacent ends, and adapted to have frictional engagement with opposite sides of said brake drum, and controlling means for said brake members, including a lever arm pivotally connected to the free end of one of said brake members, a pair of links extending on opposite sides of said brake drum, and pivotally connecting the free end of the other of said brake members with said lever arm, and means on said frame for actuating said lever arm, and means on said frame for actuating said lever arm, including a brake rod pivoted thereto, said lever arm being supported by the pivotal connections aforesaid independent of the frame.

4. In a brake, the combination of a frame, a rotatable brake drum, a collar mounted concentric with and adjacent said brake drum, means associated with said frame restraining said collar from rotation respective to said brake drum, a pair of brake members each having a pivotal connection with said collar at their adjacent ends, and adapted to have frictional engagement with opposite sides of said brake drum, and controlling means for said brake members, including a lever arm pivotally connected to the free end of one of said brake members, a link pivotally connecting the free end of the other of said brake members with said lever arm, at a point beyond but normally out of alignment with the pivotal connection of said lever arm and said first named brake member, adjustable means on said link for moving said last named pivotal connection toward or away from each other, and means on said frame for actuating said lever arm, including a brake rod pivoted thereto, said lever arm being supported by the pivotal connections aforesaid independent of the frame.

Signed at Chicago, in the county of Cook and State of Illinois, this 31st day of October, 1922.

EDWARD J. DOBERSTEIN.